United States Patent [19]
Kamuz et al.

[11] Patent Number: 5,535,294
[45] Date of Patent: Jul. 9, 1996

[54] CONNECTOR FOR MULTICHANNEL TRANSMISSION OF OPTICAL SIGNALS THROUGH ROTATING INTERFACE

[75] Inventors: Alexander M. Kamuz, Kiev, Ukraine; Sergej G. Krivoshlykov, Moscow, Russian Federation; Pavel F. Oleksenko, Kiev, Ukraine

[73] Assignee: Ceram Optec Industries, Inc., East Longmeadow, Mass.

[21] Appl. No.: 436,166

[22] Filed: May 8, 1995

[51] Int. Cl.$^6$ .................................................. G02B 6/26
[52] U.S. Cl. .................................................. 385/25; 385/28
[58] Field of Search .................................. 385/15, 20, 21, 385/25, 26, 28, 46

[56] References Cited

U.S. PATENT DOCUMENTS

| | | | |
|---|---|---|---|
| 3,428,812 | 2/1969 | Burke | 350/6.4 |
| 3,602,640 | 8/1971 | Maillet et al. | 250/227 |
| 4,050,782 | 9/1977 | Uchida et al. | 385/28 |
| 4,529,986 | 7/1985 | D'Auria et al. | 385/25 |
| 4,872,737 | 10/1989 | Fukahori et al. | 385/25 |
| 5,031,992 | 7/1991 | Corcoran | 385/25 |
| 5,115,481 | 5/1992 | Buhrer | 385/25 |
| 5,131,745 | 7/1992 | Whitney et al. | 385/25 X |
| 5,157,745 | 10/1992 | Ames | 385/25 X |
| 5,392,370 | 2/1995 | Gryk | 385/25 |
| 5,436,988 | 7/1995 | Narendran | 385/25 X |
| 5,463,704 | 10/1995 | Ziebol | 385/25 X |

Primary Examiner—Akm E. Ullah
Attorney, Agent, or Firm—Bolesh J. Skutnik

[57] ABSTRACT

A multichannel connector for transmission of optical signals between a number of input and output channels through a rotating interface is described. The connector comprises an input and an output platforms rotating around their common axis and an optical system connecting input optical signal channels to output optical channels independent on relative rotation of the platforms. The connector conserves both the amplitude and phase of the optical signals transmitted between the input and output channels. The optical system comprises either a combination of lenses and prism rings or single computer generated hologram. It can be used, for example, for connection between input and output bundles of optical fibers through a rotation interface without cross talk of the optical signals. The connector can find important industrial, military and medical applications where the optical signals from a number of channels are to be transmitted through rotating junctions.

5 Claims, 7 Drawing Sheets

CONNECTOR FOR MULTICHANNEL TRANSMISSION OF OPTICAL SIGNALS THROUGH ROTATING INTERFACE

BACKGROUND OF THE INVENTION

1. Field of the Invention

The invention relates generally to components for transformation of optical signals, and more specifically to an optical connector used to transmit optical signals coming from a number of input light transmitting channels fixed on one rotating platform to a number of output light transmitting channels fixed on another rotating platform without cross coupling between different output channels and without any other distortion of the transmitted optical information, as it is required for various military, industrial and medical applications.

2. Information Disclosure Statement

Multichannel laser beam delivery systems and optical communication systems based on transmission of information through a plurality of independent optical channels using, for example, optical fibers have found many important military, industrial and medical applications. For solution of many practically important problems it is required to have a tool for simultaneous and independent transmission of the optical signals coming from a number of input channels fixed on one rotating platform to a number of output optical channels fixed on another rotating platform without distortion of the transmitting signals. A typical example of such a problem is an optical connection through a rotary assembly of an input optical fiber bundle gathering optical signals from an array of optical fiber sensors detecting, for example, parameters of helicopter or turbine blades with an output optical fiber bundle on board the helicopter or stationary turbine platform. Other examples are gathering of amplitude information of optical signals coming from a rotating optical antenna, gathering of phase information of optical signals coming from rotating gyroscope or gathering information from optical fiber hydrophones distributed in ocean whose optical fiber cable is collected by a rotating roller on board a ship. Still another example is a medical laser delivery optical fiber bundle wherein it is required to keep optical connection between individual input and output fibers of the bundle during a medical procedure independent from rotation of a bundle tip.

Optical information coming from various sensors are usually coded either in amplitude or phase of optical wave carder. Therefore, it is extremely important to have means for optical connection between pluralities of optical fibers fixed on mutually rotating platforms which keeps both the amplitude and phase of the optical signals transmitting between corresponding fibers.

Numerous standard connectors designed for connecting optical fiber bundles can not be used to connect individual fibers of the bundle in such a way that each specific incoming optical fiber remains optically connected to each specific outgoing fiber independently on relative position of the input and the output platforms. Therefore, special connectors are to be designed to solve this problem. U.S. Pat. No. 5,392,370 describes a multichannel fiber optic rotatable interconnection system comprising step-index multimode optical fiber. The optical signals are transmitted by exciting different modes in this multimode fibers which are supposed to have minimum crosstalk. This connector, however, can not provide sufficiently good separation of different optical channels, since it is difficult to perform selective excitation and detection of modes in the multimode fiber having relatively small cross section. Even employing complicated optical systems for selective excitation and detection of different modes in the multimode fiber can not solve the problem of perfect matching of input/output optical fields to mode field configuration required for selective excitation and detection of specific fiber modes. This matching can be performed only by employing special optical means, for example, computer generated holograms. Moreover, in the case when multimode fibers are used for delivering input optical signals, a beam irradiated by each input fiber exhibits a complicated nonstationary speckle pattern resulting from interference of different fiber modes (modal noise). It is almost impossible to match this speckle pattern to a desired mode field configuration. Therefore, it is a practically important problem to provide a means for multichannel transmission of optical signals from arbitrary optical channels through a rotating interface without employing selective excitation and detection of specific modes in the optical fiber.

OBJECTS AND SUMMARY OF THE INVENTION

It is an object of the present invention to provide a rotatable connector for simultaneous transmission of optical signals between a number of channels without their cross coupling.

It is another object of the invention to provide means for transmission of optical signals between channels fixed on rotating platforms without either amplitude or phase distortions of the transmitted optical signals.

Still another object is to provide transmission of optical signals through a rotating interface for arbitrary types of input/output light delivering channels including multimode optical fibers.

Briefly stated, the present invention provides a multichannel connector for transmission of optical signals between a number of input and output channels through a rotating interface. The connector conserves both the amplitude and phase of the optical signals transmitted between the input and output channels independent of relative rotation of these optical channels. It can be used, for example, for connection between input and output bundles of optical fibers through a rotation interface without mutual overlap of the optical signals. The connector can find important industrial, military and medical applications where the optical signals from a number of channels are to be transmitted through rotating junctions.

The above, and other objects, features and advantages of the present invitation will become apparent from the following description read in conjunction with the accompanying drawings.

DESCRIPTION OF PREFERRED EMBODIMENTS

In order to achieve the goal of this invention one should provide a tool for an optical connection between input and output light beams of a first and a second platform accordingly where positions of spots of the output beams on the second platform do not depend on the relative rotation of these platforms.

Figure 1:
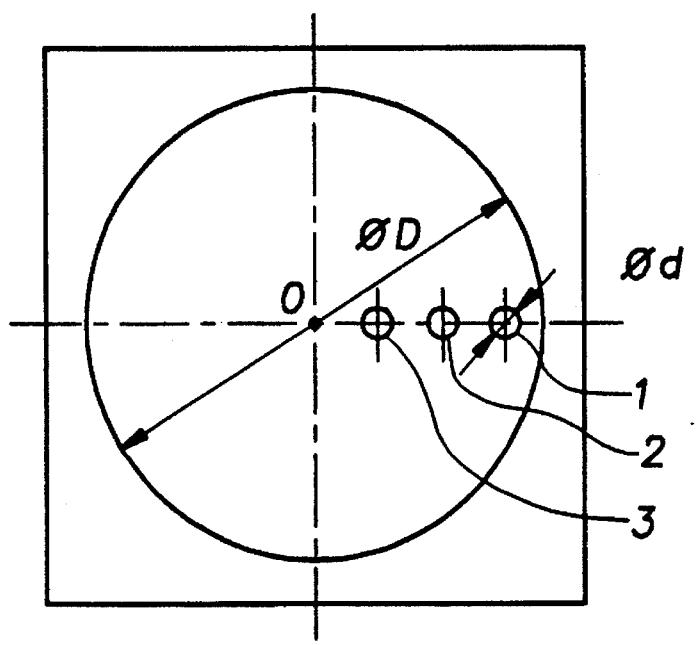
FIG. 1 shows three beam spots on the input optical plane of the output platform into which the light from three input channels of the input platform is projected.

Consider N parallel nonoverlapping beams each having diameter d coming from N independent optical channels fixed on the first platform and projected on the input optical plane of the second platform of diameter D with the help of an optical system. A standard optical collimator can be used as such a projecting system. FIG. 1 shows three of these spots in the specific case where N=3.

Figure 2:
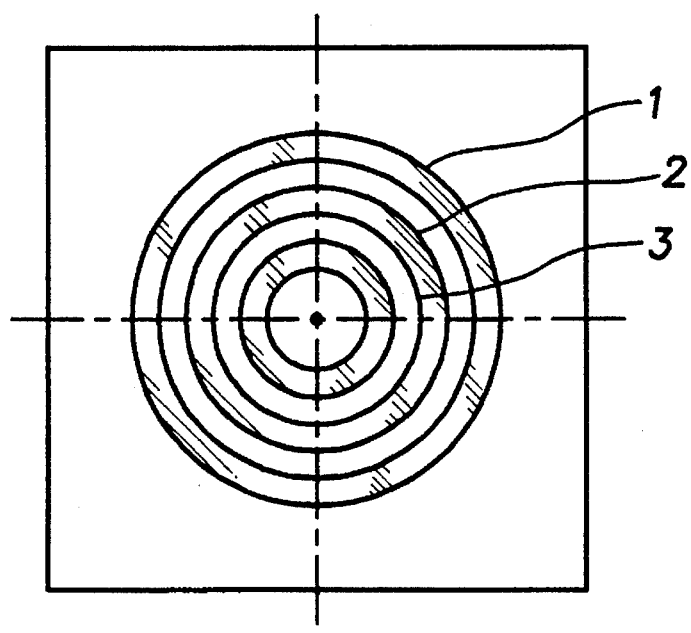
FIG. 2 shows three rings on the input optical plane of the output platform resulting from rotation of three beam spots in FIG. 1 around the optical axis of the connector.

As the first and the second platform rotate relative to each other around their common axis O the spots of the parallel beams exiting from the first platform move along rings in the input optical plane of the second platform as shown in FIG. 2. To design the desired connector one should use some optical system which focuses each ring of the input plane of the second platform into a spot on the output plane of the second platform whose position does not depend on the position of the input spot moving along the ring in the input plane of the second platform.

Figure 3:
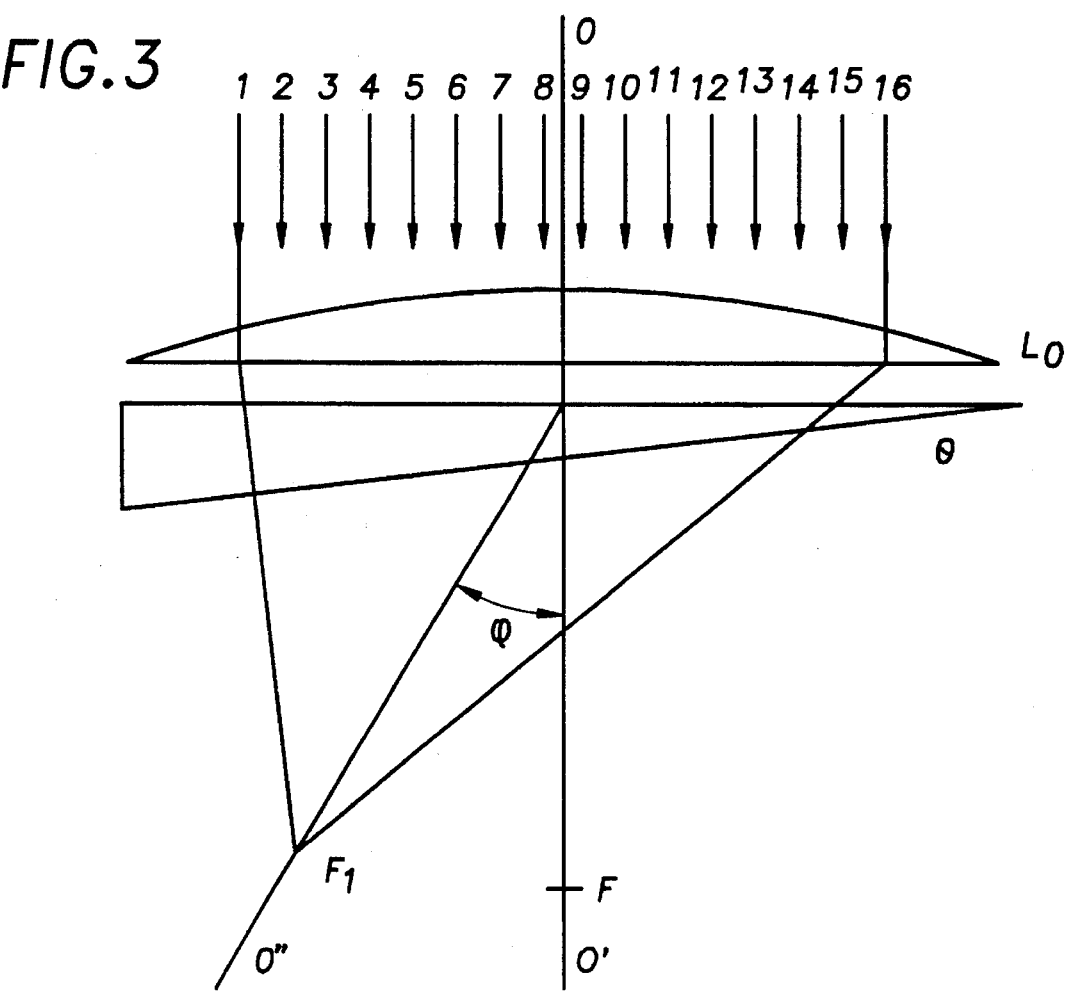
FIG. 3 shows a schematic view of an optical system comprising a lens and a prism.

One preferred embodiment of the connector employs properties of two optical components: a positive lens and a prism. Its operation can be explained by the following examples. Consider a beam of parallel rays 1–16 shown in FIG. 3. The rays propagate along the main optical axis OO' of a positive lens $L_0$ and are focused into lens focus F. Insert a thin prism P having angle θ right after and next to lens $L_0$ as shown in FIG. 3. After propagation through the prism all rays 1–16 will be collected into new focal point $F_1$ on optical axis OO" of the system which is turned by angle ψ=θ(n−1) to axis OO', where n is refractive index of the prism material. New focal point $F_1$ is located at distance b=f sin(n−1) from optical axis OO', where f is focus distance of lens $L_0$.

Figure 4:
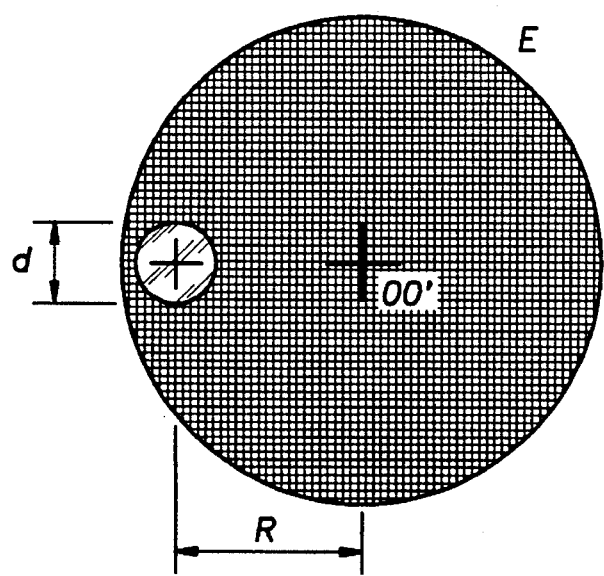
FIG. 4 shows a disk screen E having a hole of diameter d at distance R from its axis OO'.
Figure 5:
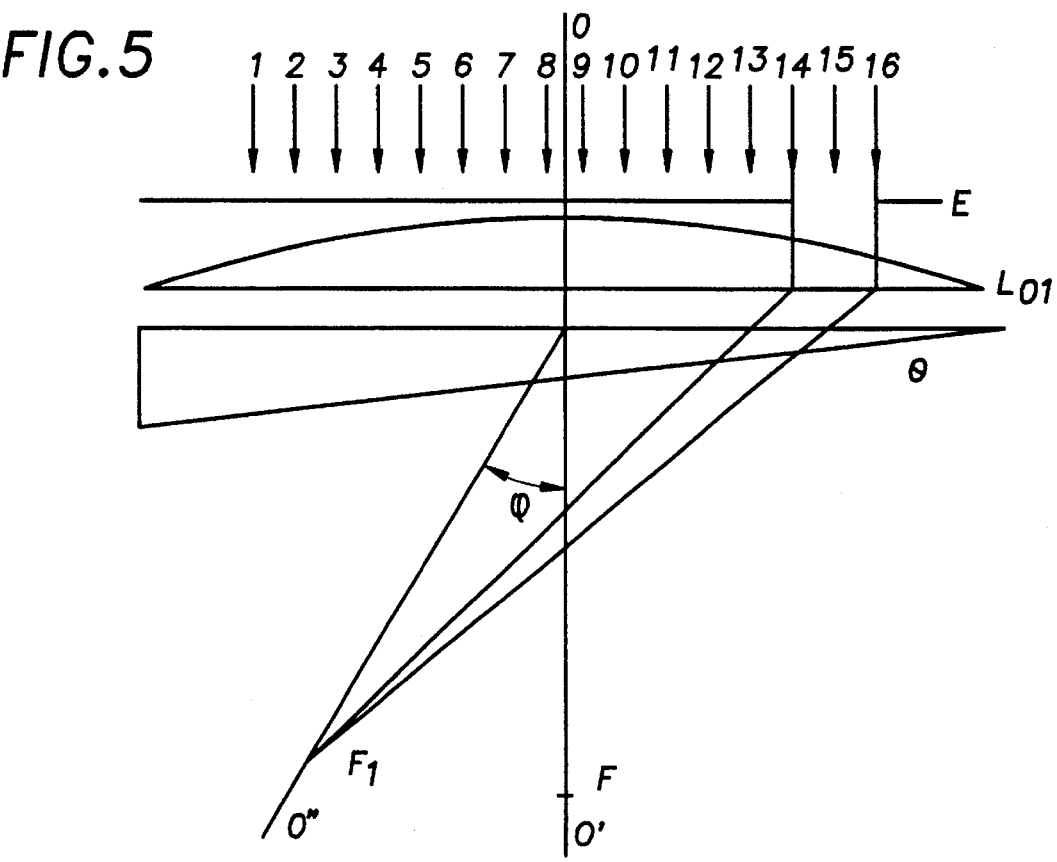
FIG. 5 shows focusing of beam rays coming through hole in disk screen E.
Figure 6:
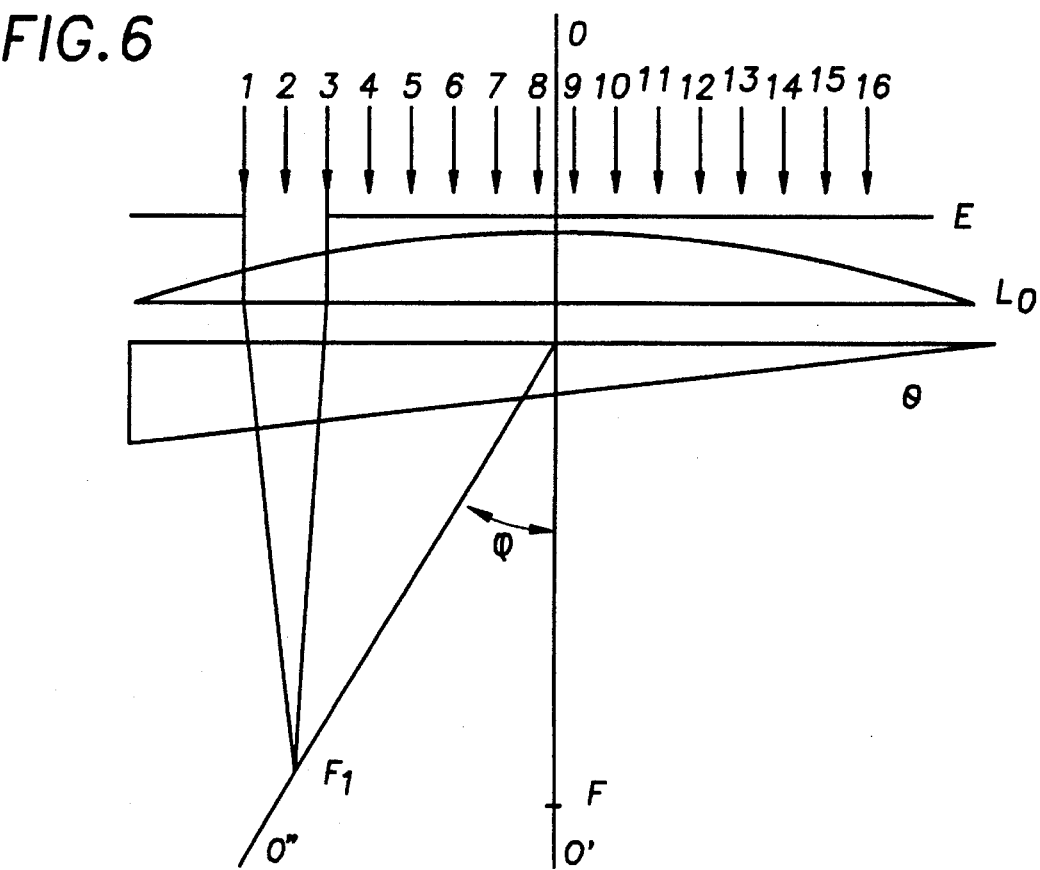
FIG. 6 is the same as FIG. 5 but in the case when disk screen E having a hole is turned over angle π around axis OO'.
Figure 7:
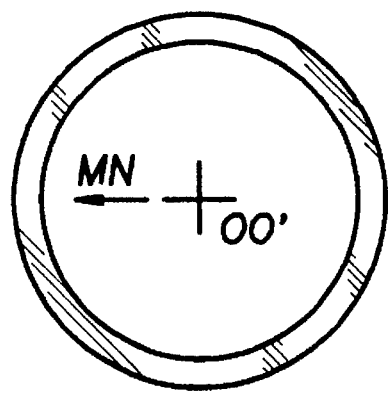
FIG. 7 shows prism ring and direction of its gradient.

If some rays are switched out (for example, rays 9–16), then the rest rays 1–8 will still be focused into focal point $F_1$. In a similar way, if rays 1–8 are terminated, then rays 9–16 will be focused into focal point $F_1$. Let us put an nontransparent plane disk screen E shown in FIG. 4 before lens $L_0$. Disk E is perpendicular to lens optical axis OO' and has a hole of diameter d whose center is at distance R from axis OO'. If disk screen E is rotated around axis OO', then at some moment of time the hole is the disk screen has a position as shown in FIG. 5. In half of the period of disk rotation the hole will take a position shown in FIG. 6. At any position of the disk the rays passing though the hole will be focused into the same focal point $F_1$. As disk screen E rotates around axis OO', its hole moves along ring-like region. All rays passing through this ring region will be focused into the same focal point $F_1$ as disk screen E rotates around axis OO'. Therefore only this ring-like region of the prism is used for focusing the rays. In offer words, one can employ only part of the prism, having a form of a ring, to focus all the rays passing through the hole moving around axis OO'. This ring prism is shown in FIG. 7, where arrow MN indicates the direction of increasing of the prism thickness (prism gradient). All the rays passing through the hole in rotating disk screen E will be focused into point $F_1$ at distance b from axis OO' in the direction of the prism gradient.

Figure 8:
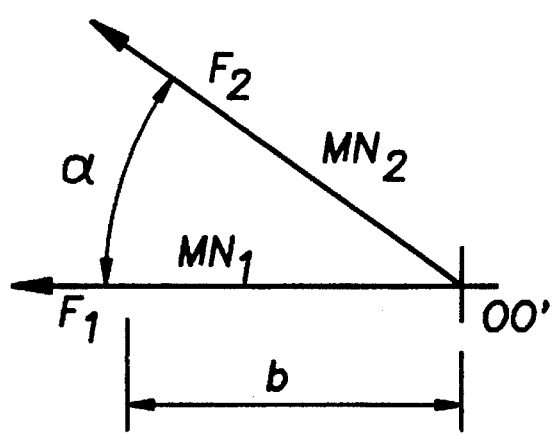
FIG. 8 shows positions of focal points $F_1$ and $F_2$ before and after rotation of the prism ring gradient over angle $\alpha$ around axis OO'.
Figure 9:
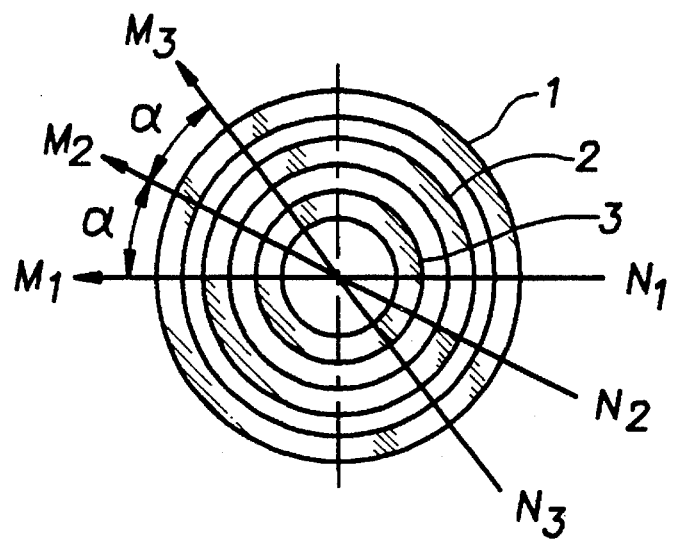
FIG. 9 shows three ring prisms whose gradient vectors are turned over angle $\alpha$ relative to each other.
Figure 10:
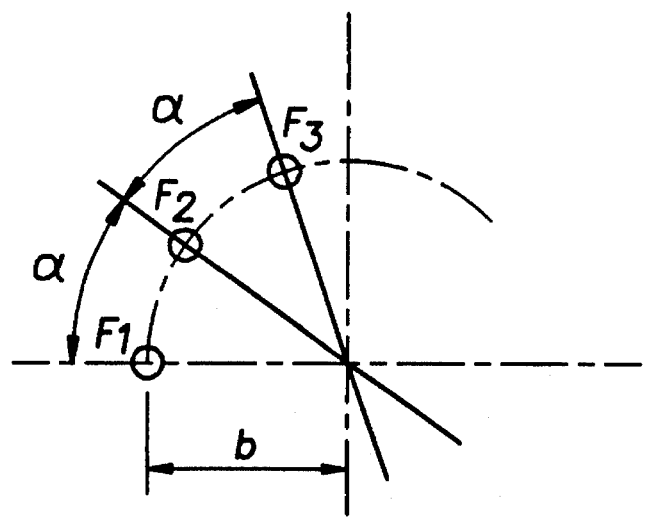
FIG. 10 shows three output beam focal spots located along a circle in the output optical plane of the output platform.

If the prism ring is mined over angle $\alpha$ around axis OO', then prism gradient MN will also be turned over the same angle $\alpha$ and focal point $F_1$ will take new position $F_2$ as shown in FIG. 8. In the case of a system of three concentric prism rings which are consequently turned relative each other around the optical axis OO' in such a way that their gradient vectors MN are consequently turned over an angle $\alpha$, as it is shown in FIG. 9, the light from beams 1,2,3 moving along corresponding rings will be always focused into output spots $F_1$, $F_2$, $F_3$, accordingly, as shown in FIG. 10, independent of the position of the input beam spots moving along the rings. All the output spots $F_1$, $F_2$, $F_3$ are located along a circle concentric with the axis OO'. Thus, in general case of the described optical system comprising a combination of a lens and N concentric prism rings, the system can perform continuous optical connection between N input signal beams moving along corresponding rings and N output signals detected in corresponding focal points $F_1$ fixed along a circle in output optical plane. An important advantage of the described optical system is a possibility of simultaneous and independent transmission of optical signals between many optical channels fixed on rotating platforms without any amplitude and phase distortions of the optical signal resulting from such a rotation, since each input optical channel moving along corresponding ring remains always optically connected to a specific output channel.

One of the most important applications of the rotating optical connector specified above is for optical connecting the bundles of optical fibers fixed on two independently rotating platforms. In one preferred embodiment, in order to realize such a connection one should supply ends of the fibers in the input bundle of the first platform with a standard optical systems which form parallel light beams exiting from the fiber end faces and also use standard optical systems on the second platform to couple the focused output beams into the corresponding fibers of the output bundle. This provides optical connection between input and output fibers, independent of relative rotation of the platform.

Figure 11:
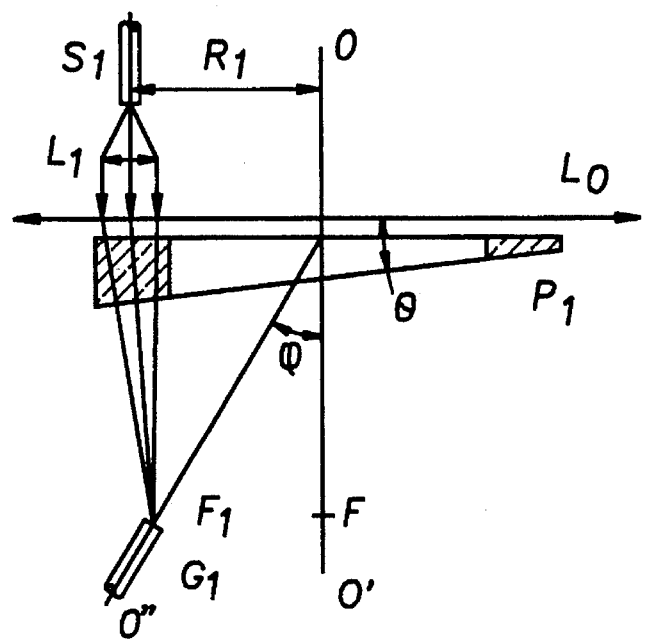
FIG. 11 schematically shows an optical fiber connector employing a combination of lens $L_0$ and one prism ring $P_1$.
Figure 12:
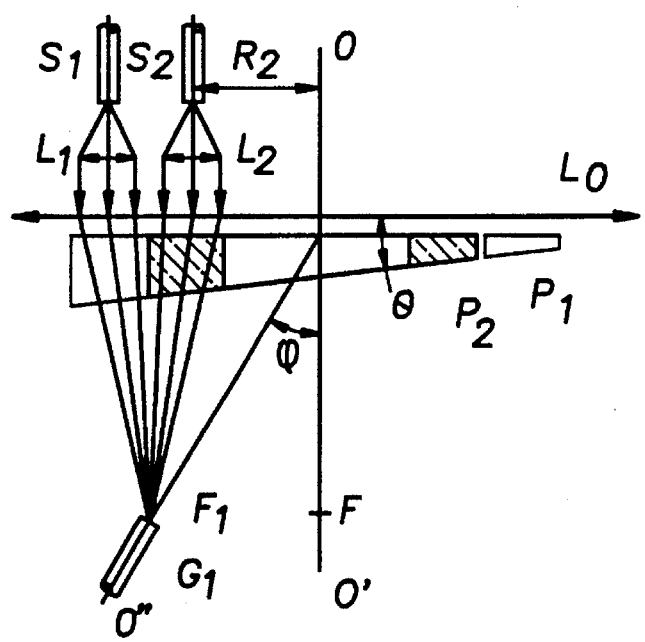
FIG. 12 schematically shows an optical fiber connector employing a combination of lens $L_0$ and two prism rings $P_1$ and $P_2$.

Let us illustrate operation of this system for optical connection between fibers on few simple examples. FIG. 11 shows one preferred embodiment of the system connecting light delivering fiber $S_1$ and light receiving fiber $G_1$. Light beam irradiated by light delivering fiber $S_1$ is projected with the help of lens $L_1$ onto the optical system comprising lens $L_0$ and ring prism $P_1$. In the case when beam diameter d is not larger than width of the prism ring all the beam is focused by lens $L_1$ and prism ring $P_1$ into focal point $F_1$ and coupled into light receiving output fiber $G_1$. Note, that angle $\psi$ shown in FIG. 11 is very small, since it must be less than prism angle $\theta$. It is especially increased in this figure for illustration. As input fiber $S_1$ moves along circle of radius $R_1$, it remains optically connected to output fiber $G_1$. Consider the second input fiber $S_2$ moving at distance $R_2$ around axis OO' as shown in FIG. 12. The beam irradiated by fiber $S_2$ is projected by lens $L_2$ and focused by lens $L_1$ and prism ring $P_2$ into focal point $F_1$. If prism rings $P_1$ and $P_2$ are turned over angle $\alpha$ relative to each other, then beam of fiber $S_2$ can be focused into focal point $F_1'$ and finally coupled into the second output fiber $G_2$ (it is not shown in FIG. 12). In a similar way, employing N ring prisms whose gradients are consequently turned on some angle $\alpha$, one can realize optical connection between N moving input fibers $S_N$ and N output fibers $G_N$ fixed on the output platform.

Consider, for example, in the case of a multimode fiber with removed jacket having the cladding diameter 150 µm and the core diameter 50 µm. When wavelength $\lambda$=0.63 µm, n=1.5, f=50 mm, D=0.8 f=40 mm, $\theta$=4°, and diameter of parallel beam incident the lens is d=1.6 mm, then diameter of the output beam waist in focal point $F_1$ is 2r=2(1.22 f$\lambda$/d)=48 µm, which is compatible with the diameter of the output multimode fiber. Centers of all output beams are located at distance b=f sin {$\Theta$(n−1)}=1.59 mm from the optical axis. If diameter of a jacket of the output fibers is 0.3 mm, then prism rings should be consequently turned over the angle $\alpha$=arctan(0.3/1.59)=10.6°. In the case of the input beam having diameter d =1.6 mm, the number of fibers that can be connected is equal to N=(D/2)/d=12.

Consider the case of a single-mode fiber having the cladding diameter of 150 µm and the core diameter of 10 µm. When $\lambda$=0.63 µm, n=1.5, f=50 mm, D=0.8 f=40 mm, $\theta$=4° to get diameter of an output beam of 9.98 µm (compatible to the core diameter for the single-mode fiber), one should use the input beams with diameter d=7.7 mm. In this case the number of single mode fibers to be connected is equal to N=(D/2)/d=2.

The main loss of the light coming through the connector results from Fresnel reflections on the optical components inside the connector and they can be minimized using standard antireflecting coating technique.

The combination of lens $L_0$ and prism rings $P_N$ is not the only optical system which can be used in multichannel optical connector described above. In general case, the lens performs quadratic correction of the wavefront of an incoming beam while each prism ring performs additional linear phase shift in the direction of corresponding gradient MN. The same transformation of the beam wavefront can be performed with the help of a computer generated hologram which combines together both the quadratic and the linear phase shifts and can be used instead of lens and prisms described above. The computer generated hologram can replace either the system offing prisms or both the system of prism rings and lens $L_0$. For example, the hologram replacing three prism rings has a structure of concentric ring-like regions (similar to that shown in FIG. 9), each of them performing linear phase shift of the incident wavefront in the direction of the gradient MN of corresponding prism ring. The hologram replacing both the lens and the prism ring system has more complicated structure. However, it can be easily generated with the help of computer. General procedure of fabrication of computer generated holograms performing desired wavefront transformation is known state of the art. It includes the steps of computer simulation of the desired wavefront transformation and picturing the corresponding hologram on an appropriate photosensitive material with the help a moving laser beam controlled by a computer. Therefore, one can apply this technology to fabricate the specific hologram which performs the required wavefront transformation.

Figure 13:
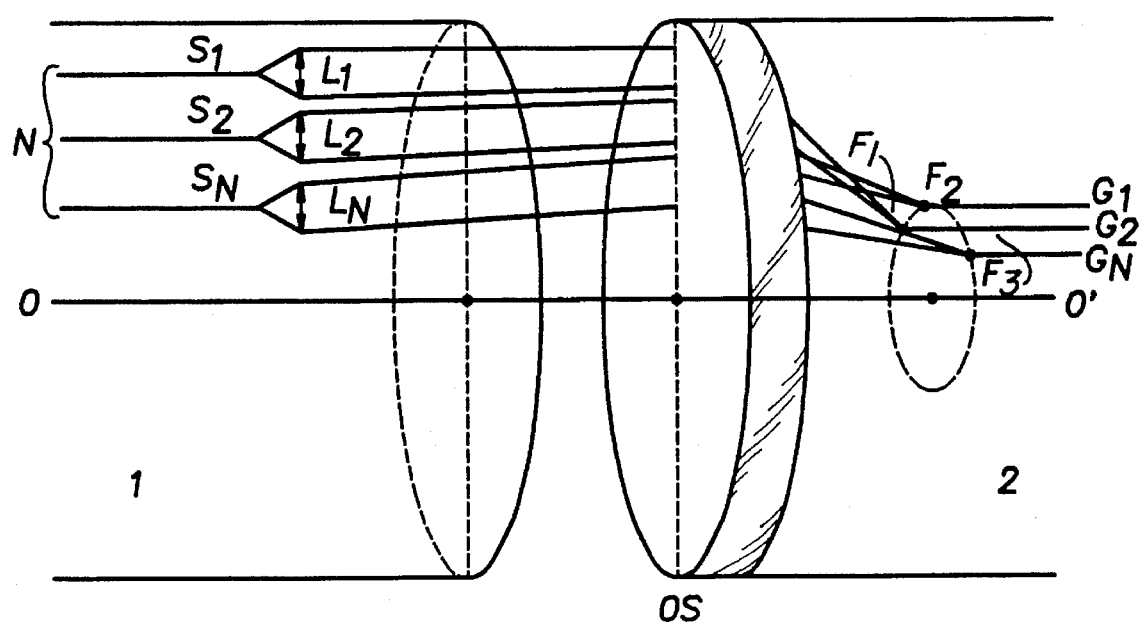
FIG. 13 schematically shows a multichannel optical fiber connector for transmission of signals through a rotating interface.

One preferred embodiment of a multichannel optical fiber connector for transmission of signals through a rotating interface is schematically illustrated in FIG. 13. The connector comprises of input platform 1 and output platform 2 rotating around common axis OO'. N input fibers $S_1, S_2, \ldots, S_N$ are fixed on platform 1 and generally have input optical systems $L_1, L_2, \ldots, L_N$ to form preferably parallel output beams from these fibers. The input optical system, however, does not necessarily employ lenses. It may comprise of the fiber end faces optically adjusted directly to the input optical plane of the output platform. Output platform 2 has output optical system OS which focus these beams into N different focal points $F_1, F_2, \ldots, F_N$ located along a circle perpendicular to axis OO' and eventually couple them into output fibers $G_1, G_2, \ldots, G_N$. For improving coupling efficiency, numerical aperture of the beams should be matched to numerical aperture of the fibers. The output optical system operates in such a way that that N input fibers $S_1, S_2, \ldots, S_N$ always remain optically connected to N output fibers $G_1, G_2, \ldots, G_N$ independent on relative rotation of platform 1 and platform 2. Therefore, the connector keeps both the amplitude and the phase of transmitted signal. Output optical system OS is described above in detail. It may comprise a combination of a lens $L_0$ and prism rings $P_1, P_2, \ldots, P_N$, a combination of lens $L_0$ and computer generated hologram replacing prism rings or a single computer generated hologram replacing both the lens and prism rings.

Having described preferred embodiments of the invention with reference to the accompanying drawings, it is to be understood that the invention is not limited to the precise embodiments, and that various changes and modifications may be effected therein by skilled in the art without departing from the scope or spirit of the invention as defined in the appended claims.

What is claimed is:

1. A system for optical connection between at least two input and two output optical channels comprising:
   an input platform;
   an output platform;
   an axis around which at least one of the platforms can be rotated;
   said input and output channels are fixed with respect to said input and output platforms respectively and at least one of said platforms has an optical system linking said channels in a permanent manner independent of the relative rotation of the platforms, wherein: said optical system generally comprises:
   an input and an output part fixed on corresponding input and output platforms;
   said input part of said optical system collects light beams coming from each individual input channel of said input platform and projects them onto non-overlapping beam spots on an input optical plane of said output rotating platform which is perpendicular to said axis;
   centers of each said beam spots on said input optical plane are located at certain distances from said axis of connector so that said beam spots move along rings in said input optical plane concentric with said axis of the connector as said platforms are mutually rotated;

said output part of said optical system fixed on said output rotating platform collects all light beams coming from said rings in said input optical plane of said output platform and focuses each of them into non-overlapping output beam spots located along a circle in an output optical plane, where said circle is concentric with said axis of connector, such that, positions of said output spots remain independent of relative rotation of said input and output platforms; light of each said output beam spots is finally coupled into a corresponding output channel of said rotating output platform.

2. A system for optical connection between optical channels of claim 1, wherein said optical system linking said channels comprises:

a lens optically connected with a system of nonoverlapping concentric prism rings; the number of said prism rings is equal to the number of input and output optical channels;

each of said prism rings has an optical axis, a certain width and a gradient vector indicating a direction of increasing of the prism thickness;

said optical axis of all said prism rings coincides with said optical axis of said connector, width of each prism ring is not smaller than width of corresponding said rings on said input optical plane of said output platform and said gradient vectors of said ring prisms are consequently rotated around said optical axis relative to each other over some angles to prevent overlapping of output beam spots located along a circle in said output optical plane of the output platforms concentric with said connector's axis.

3. A system for optical connection between optical channels of claim 2, wherein a computer generated hologram is used instead of said lens and ring prisms to perform equivalent light focusing functions like a combination of said lens and prism rings.

4. A system for optical connection between optical channels of claim 1, wherein input optical channels comprise at least two optical fibers, said input part of said optical system further comprises end faces of said optical fibers adjusted to said input optical plane of the output rotating platform.

5. A system for optical connection between optical channels of claim 4, wherein output optical channels comprise at least two optical fibers, said output beam spots in said output optical plane of said output platform are projected onto end faces of said output fibers to match their apertures to corresponding apertures of said output fibers.

\* \* \* \* \*